United States Patent [19]
Rosen

[11] Patent Number: 5,452,323
[45] Date of Patent: Sep. 19, 1995

[54] SIMPLE ASYNCHRONOUS DATA SYNCHRONIZER TO A FASTER CLOCK

[75] Inventor: Philip G. Rosen, El Segundo, Calif.

[73] Assignee: Hughes Aircraft Company, Los Angeles, Calif.

[21] Appl. No.: 161,622

[22] Filed: Dec. 6, 1993

[51] Int. Cl.6 ............... H04L 7/02; H03K 5/135
[52] U.S. Cl. ................. 375/354; 375/359; 370/108; 326/93; 327/161; 327/162; 327/291
[58] Field of Search ............ 375/106, 110, 113; 370/44, 84, 91, 94.2, 100.1, 108; 326/93; 327/153, 160, 161, 162, 291

[56] References Cited

U.S. PATENT DOCUMENTS

| | | | |
|---|---|---|---|
| 4,371,962 | 2/1983 | Zeitraeg | 375/106 |
| 4,553,129 | 11/1985 | McNesby et al. | 370/102 |
| 5,012,138 | 4/1991 | Suzuki | 328/72 |
| 5,233,617 | 8/1993 | Simmons et al. | 307/269 |
| 5,287,389 | 2/1994 | Ichibangase et al. | 375/106 |

*Primary Examiner*—Young Tse
*Attorney, Agent, or Firm*—Leonard A. Alkov; W. K. Denson-Low

[57] ABSTRACT

A data synchronizer (10) for synchronizing data generated by a data source (16) at a first rate includes a first timer (22) for generating a first timing signal at the first rate. A first register (20) connected to the first timer (22) has an input connected to the data source (16). The first register (20) temporarily stores multi-bit data words from the date source (16). A second timer (26) generates a second timing signal at the second rate. A second register (24) connected to the second timer (26) has an input connected to an output of the first register (20). The second register (24) temporarily stores multi-bit data words from the first register (20). A synchronizer connected to the first and second timers (22, 26) generates a good data signal when the multi-bit data words from the first register (20) is available at an output of the second register (24).

9 Claims, 2 Drawing Sheets

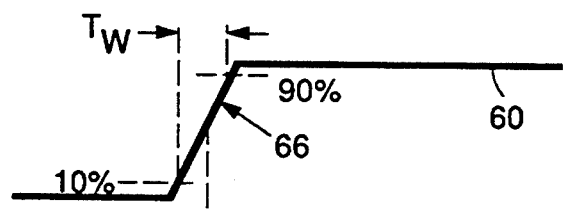
FIG. 3A.
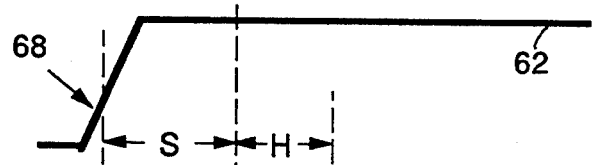
FIG. 3B.
FIG. 3C.
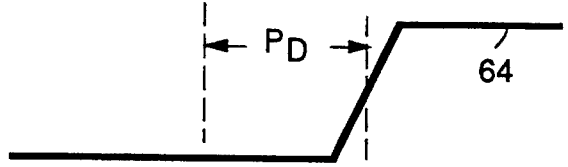
FIG. 3D.
FIG. 4.
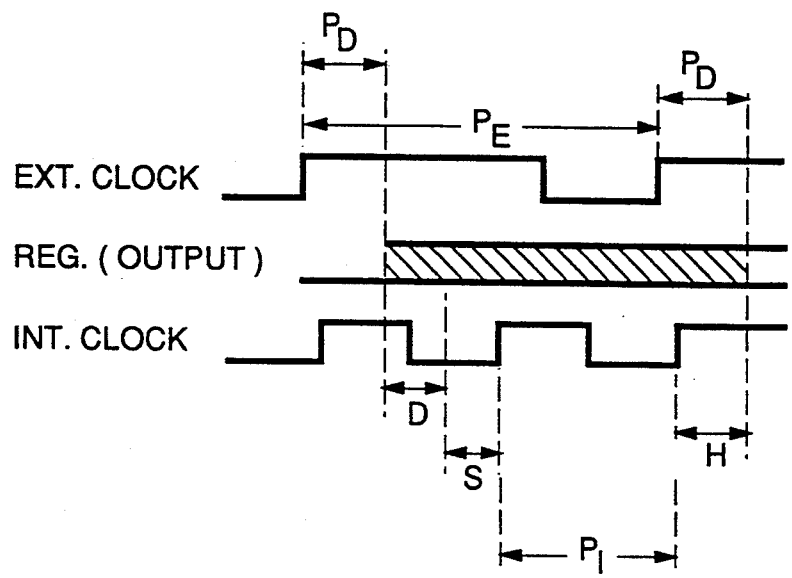

SIMPLE ASYNCHRONOUS DATA SYNCHRONIZER TO A FASTER CLOCK

This invention was made with Government support under N00019-89-C-0130 awarded by the Department of the Navy. The Government has certain rights in this invention.

BACKGROUND OF THE INVENTION

1. Technical Field

This invention relates to data synchronizers and, more particularly, to data synchronizers for synchronizing data to a faster clock rate.

2. Discussion

As the use of microprocessor-based control systems increases, the need for data synchronization increases. Often external data sources connected to the microprocessor system generate data at an external clock rate which is slower than an internal clock rate of the microprocessor. The data sources can be multi-bit, for example 16- and 32-bit, gate arrays. In one application, the data synchronizer synchronizes radar sensor data to an internal clock rate of an aircraft's microprocessor.

Conventional data synchronizers typically use first-in-first-out (FIFO) or ping-pong memories. These conventional data synchronizers operate effectively, however, they use a significant number of gates. For example, synchronizing a 32-bit data path using a 32×16 bit FIFO memory requires at least 12,000 gates in addition to control logic.

Therefore it is desirable to design an asynchronous data synchronizer using fewer gates to decrease size, cost, and complexity.

SUMMARY OF THE INVENTION

A data synchronizer for synchronizing data generated by a data source at a first rate includes a first timer for generating a first timing signal at the first rate. A first register connected to the first timer has an input connected to the data source. The first register temporarily stores multi-bit data words from the date source. A second timer generates a second timing signal at the second rate. A second register connected to the second timer has an input connected to an output of the first register. The second register temporarily stores multi-bit data words from the first register. A synchronizer connected to the first and second timers generates a good data signal when the multi-bit data words from the first register is available at an output of the second register.

In another feature of the invention, the data synchronizer includes a third register connected to the first timer for generating a toggle signal.

In another feature of the invention, the data synchronizer includes a delay device connected to the third register for generating a delayed toggle signal. The delayed toggle signal provided by the delay device is related to the first rate minus the second rate, the time required to setup at least one of the first and second registers, and the time required to hold of at least one of the first and second registers.

In yet another feature of the invention, the data synchronizer includes a fourth register connected to the second timer and having an input connected to an output of the delay device. A fifth register is connected to the second time and has an input connected to an output of the fourth register. An exclusive OR gate has a first input connected to an output of the fourth register and second input connected to an output of the fifth register. The good data signal is generated at an output of the exclusive OR gate.

In still another feature of the invention, the data synchronizer further includes a control signal device for generating a control signal which enables the third register to generate the toggle signal.

Other objects, features and advantages will be readily apparent.

BRIEF DESCRIPTION OF THE DRAWINGS

The various advantages of the present invention will become apparent to those skilled in the art after studying the following specification and by reference to the drawings in which:

FIGS. 3A–3D are diagrams illustrating setup delay, hold delay, and propagation delay of a register; and FIG. 4 is a diagram of timing waveforms illustrating calculation of a delay for a delay device according to the invention.

DESCRIPTION OF THE PREFERRED EMBODIMENT

Figure 1:
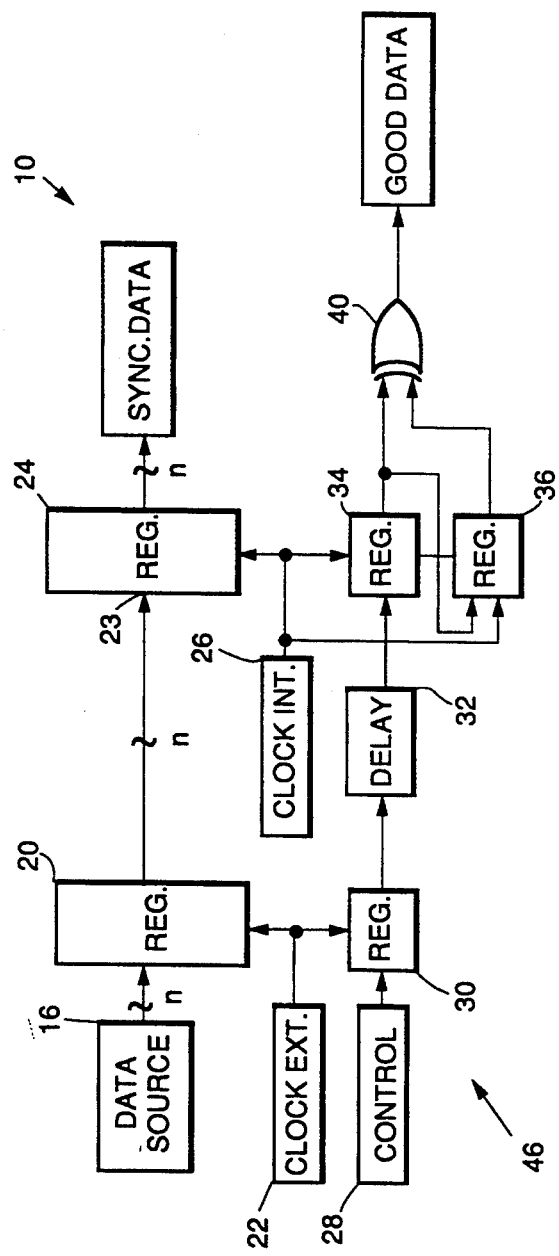
FIG. 1 is a combination block diagram and electrical schematic of an asynchronous data synchronizer according to the invention.
Figure 2:
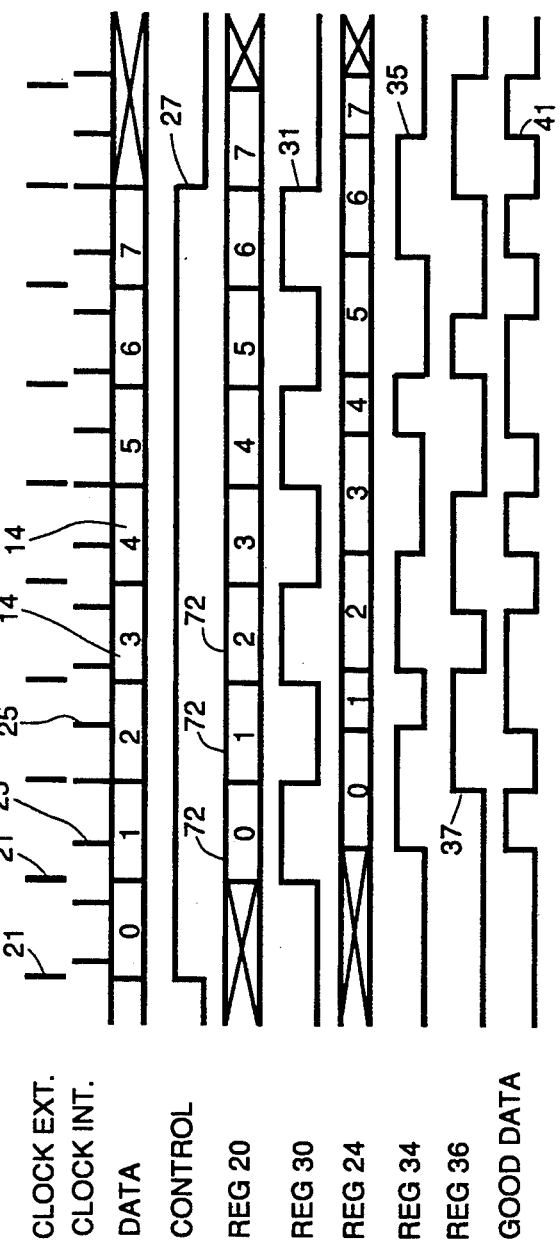
FIG. 2 is a diagram of timing waveforms of components of the asynchronous data synchronizer of FIG. 1.

In FIG. 1, an asynchronous data synchronizer 10 according to the invention is shown. FIG. 2 illustrates timing waveforms of components of the asynchronous data synchronizer 10. Data in the form of an n-bit words 14 (FIG. 2) from a data source 16 is input to a first register 20 at an external clock rate (at 21 in FIG. 2) determined by an external clock 22. An output of the first register 20 is input to a second register 24 operating at an internal clock rate (at 25 in FIG. 2) determined by an internal clock 26. A synchronized data signal is output by the second register 24, as will be described below.

A control signal 27 (FIG. 2) generated by a control signal source 28 enables and disables a third register 30. When enabled, the third register 30 provides a toggle signal 31 (FIG. 2) at the external clock rate of the external clock 22 which is connected thereto. The toggle signal is input to a delay device 32 which generates a delayed toggle signal. The delayed toggle signal is input to a fourth register 34 which is connected to the internal clock 26.

An output 35 (FIG. 2) of the fourth register 34 is connected to an input of a fifth register 36, and fourth register 34 and fifth register 36 are connected to the internal clock 26. The output 35 of the fourth register 34 and an output 37 of the fifth register 36 are input to an exclusive OR (XOR) gate 40 which generates a good data signal 41 (FIG. 2).

In use, data from the external data source 16 is clocked into the first register 20 at the external clock rate. The external clock rate is slower than the internal clock rate. To synchronize the data 14 from the data source 16 provided at the external clock rate to the internal clock rate, the asynchronous data synchronizer 10 provides the good data signal 41 signifying that data from the first register 20 has reached the output of the second register 24. The delay device 32 must provide a minimum delay to guarantee that the data has reached the output of the second register 24. However, the delay device 32 must also minimize the delay to maximize a synchronization rate of the asynchronous data synchronizer 10.

When the good data signal 41 is high, the n-bit data word at the output of the second register 24 is ready to be read. When the good data signal is low, the data at the output of the second register 24 is in a transition between a prior n-bit data word (previously read) and a new n-bit data word.

In FIG. 2, timing waveforms for the asynchronous data synchronizer 10 are shown. As can be appreciated, the external clock rate must be slower than the internal clock rate.

The duration of the delay of the delay device 32 is described below in conjunction with FIGS. 3 and 4. Registers 20 and 24 can be any type of n-bit data registers. Register 30 can be a one-bit register or toggle. Registers 34 and 36 can be one-bit registers. Each of the registers can be D-type flip-flops. Other types of registers are contemplated.

For purposes of illustration, D-type flip-flops will be used in FIGS. 3A–3D and 4. Those skilled in the art can appreciate that other types of registers can be readily substituted. FIG. 3A illustrates an idealized clock waveform 60 input to a D-type register, FIGS. 3B and 3C illustrate an idealized data waveform input 62 to the D-type register of FIG. 3A, and FIG. 3D illustrates an idealized output 64 of the register in response to the idealized input 62.

Triggering of D-type flip-flops typically occurs on a positive-going edge 66 of the clock waveform 60. A transition 68 in the data waveform 62 precedes the positive-going edge 66 of the clock waveform by a setup time S. If the D-type flip-flop is to recognize and properly respond to new data in the data waveform 62, the transition 68 must precede the positive-going edge by at least the setup time S. If the transition 68 in the data waveform 62 is to be recognized by the D-type flip-flop without fail, the data waveform 62 must remain high for at least a hold time H. A transition width $T_W$ is typically defined as a time for transition between 10 and 90 percent of low and high states, respectively. In summary, if the D-type flip-flop is to respond to the change in the data waveform 62, the transition 68 must occur at least the setup time S before the positive-going edge 66 and persist at least the hold time H thereafter.

If the transition 68 in the data waveform meets the setup and hold times, a propagation delay $P_D$ occurs before the output of the D-type flip-flop changes state in response to the transition 68. Additionally, hold, setup and propagation times can be different depending upon whether the data makes a transition from low to high or high to low, therefore maximum times (indicated by (max) below) as defined by the manufacturer are used for each.

In FIG. 4, an external clock waveform 70 having an external clock period $P_E$, a n-bit data word 72 (FIG. 2) output of the first register 20, and an internal clock waveform having an internal clock period $P_I$ are shown. D represents the delay of the delay device 32. As can be appreciated from FIG. 4, $$P_E + P_D(\max) = P_D(\max) + D(\max) + S(\max) + P_I + H(\max) \quad [1]$$

$$P_E = D(\max) + S(\max) + P_I + H(\max), \quad [2]$$

$$D(\max) = P_E - P_I - S(\max) - H(\max). \quad [3]$$

Since the maximum values for setup time S, the hold time H, and the internal and external clock rates are known, the delay time D can easily be set and optimized using equation [3].

Registers can be connected to an output of the register 24 and an output of the XOR gate 40 to accommodate metastable states.

The delay device 32 can be any device providing a predetermined delay with minimum variance with respect to temperature and voltage. The delay device 32 can be a delay element, a delay line, etc.

As can be appreciated, the number of gates required for the asynchronous data synchronizer can be greatly reduced from conventional FIFO and ping-pong memories. For example synchronizing a 32 bit data path with a 32×16 bit FIFO requires at least 12,000 gates in addition to control logic. By contrast, the asynchronous data synchronizer 10 of the present invention requires only 875 gates for the 32 bit data path, which reduces the number of gates by a factor of 121. The asynchronous data synchronizer of the present invention uses fewer gates which decreases size, cost, and complexity. Other objects, features and advantages will be readily apparent.

The various advantages of the present invention will become apparent to those skilled in the art after a study of the foregoing specification and following claims.

What is claimed is:

1. A data synchronizer for synchronizing data generated by a data source at a first rate to a second rate faster than said first rate, comprising:
   first timing means for generating a first timing signal at the first rate;
   first register means connected to the first timing means and having an input connected to said data source, said first register means for temporarily storing multi-bit data words from said data source;
   second timing means for generating a second timing signal at the second rate;
   second register means connected to the second timing means and having an input connected to an output of the first register means, said second register means for temporarily storing multi-bit data words from said first register means; and
   synchronizing means connected to said first and second timing means for generating a good data signal when said multi-bit data words from said first register means is available at an output of said second register means.

2. The data synchronizer of claim 1 wherein said synchronizing means further includes:
   third register means connected to said first timing means for generating a toggle signal.

3. The data synchronizer of claim 2 wherein the synchronizing means further includes:
   delay means connected to said third register means for generating a delayed toggle signal.

4. The data synchronizer of claim 3 wherein the delayed toggle signal provided by the delay means is related to the first rate minus the second rate, the time required to setup at least one of the first and second register means, and the time required to hold at least one of the first and second register means.

5. The data synchronizer of claim 4 wherein the synchronizing means further includes:

a fourth register means connected to said second timing means and having an input connected to an output of said delay means;

a fifth register means connected to said second timing means and having an input connected to an output of said fourth register means; and an exclusive OR gate having a first input connected to the output of said fourth register means and a second input connected to an output of said fifth register means, wherein said good data signal is generated at an output of said exclusive OR gate.

6. The data synchronizer of claim 5 wherein said synchronizing means further includes:

control signal means for generating a control signal which enables said third register means to generate said toggle signal.

7. A data synchronizer for synchronizing data generated by a data source at a first rate to a second rate faster than said first rate, comprising:

first timing means for generating a first timing signal at the first rate;

first register means connected to the first timing means and having an input connected to said data source, said first register means for temporarily storing multi-bit data words from said data source;

second timing means for generating a second timing signal at the second rate;

second register means connected to the second timing means and having an input connected to an output of the first register means, said second register means for temporarily storing multi-bit data words from said first register means; and synchronizing means connected to said first and second timing means for generating a good data signal when said multi-bit data words from said first register means is available at an output of said second register means, said synchronizing means including:

third register means connected to said first timing means for generating a toggle signal, and delay means connected to said third register means for generating a delayed toggle signal, wherein the delayed toggle signal provided by the delay means is related to the first rate minus the second rate, the time required to setup at least one of the first and second register means, and the time required to hold at least one of the first and second register means.

8. The data synchronizer of claim 7 wherein the synchronizing means further includes:

a fourth register means connected to said second timing means and having an input connected to said delay means;

a fifth register means connected to said second timing means and having an input connected to an output of said fourth register means; and an exclusive OR gate having a first input connected to the output of said fourth register means and a second input connected to an output of said fifth register means, wherein said good data signal is generated at an output of said exclusive OR gate.

9. A data synchronizer for synchronizing data generated by a data source at a first rate to a second rate faster than said first rate, comprising:

first timing means for generating a first timing signal at the first rate;

first register means connected to the first timing means and having an input connected to said data source, said first register means for temporarily storing multi-bit data words from said data source;

second timing means for generating a second timing signal at the second rate;

second register means connected to the second timing means and having an input connected to an output of the first register means, said second register means for temporarily storing multi-bit data words from said first register means; and synchronizing means connected to said first and second timing means for generating a good data signal when said multi-bit data words from said first register means is available at an output of said second register means, said synchronizing means including:

third register means connected to said first timing means for generating a toggle signal, delay means connected to said third register means for generating a delayed toggle signal, wherein the delayed toggle signal provided by said delay means is related to the first rate minus the second rate, the time required to setup at least one of the first and second register means, and the time required to hold at least one of the first and second register means, a fourth register means connected to said second timing means and having an input connected to said delay means, a fifth register means connected to said second timing means and having an input connected to an output of said fourth register means, an exclusive OR gate having a first input connected to the output of said fourth register means and a second input connected to an output of said fifth register means, wherein said good data signal is generated at an output of said exclusive OR gate.

* * * * *